(No Model.)
C. M. BLYDENBURGH.
VEHICLE SPRING.
No. 403,323. Patented May 14, 1889.
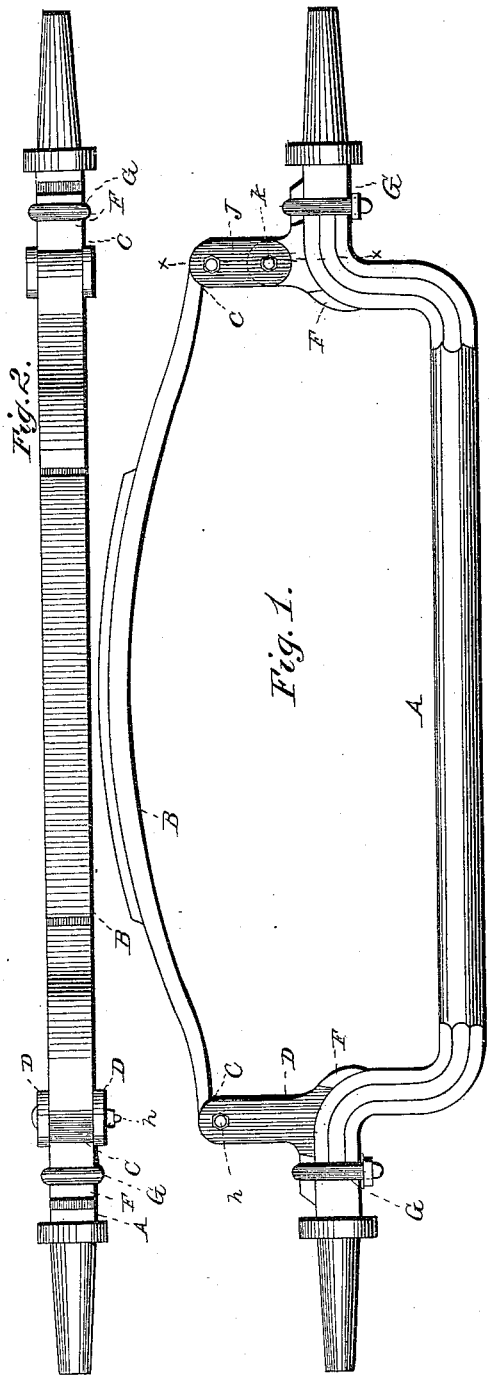
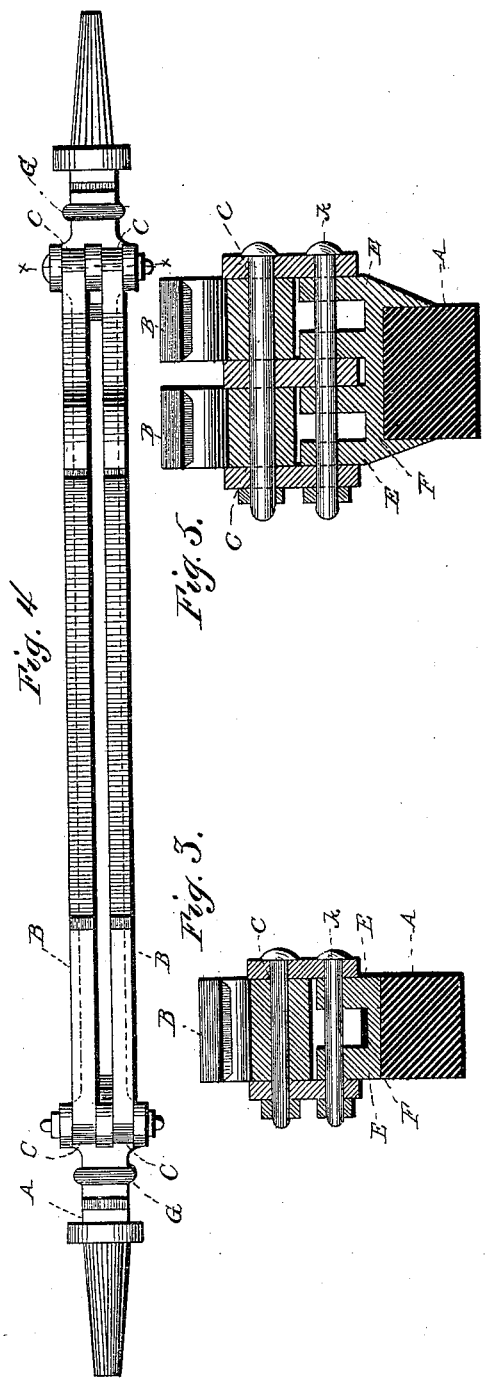
WITNESSES.
M. B. Harris
E. R. Ferguson
INVENTOR.
C. M. Blydenburgh
by E. W. Anderson
Attorney.

UNITED STATES PATENT OFFICE.

CHARLES M. BLYDENBURGH, OF RIVERHEAD, NEW YORK.

VEHICLE-SPRING.

SPECIFICATION forming part of Letters Patent No. 403,323, dated May 14, 1889.

Application filed November 12, 1887. Serial No. 255,028. (No model.)

*To all whom it may concern:*

Be it known that I, CHARLES M. BLYDENBURGH, a citizen of the United States, and a resident of Riverhead, in the county of Suffolk and State of New York, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a side elevation of my improved vehicle-spring. Fig. 2 is a plan view. Fig. 3 is a transverse section on line $x\,x$, Fig. 1. Fig. 4 is a plan view of a modified form. Fig. 5 is a transverse section on line $x\,x$, Fig. 4.

The invention has relation to vehicle-springs; and it consists in the novel construction and combination of devices, as hereinafter set forth.

The object of the invention is to provide, in combination with the axle of a vehicle, an arched spring and connections whereby the liability to friction is materially diminished in an economical and practical manner.

In the accompanying drawings, the letter A designates an axle, and B a spring above said axle, said spring being arched upwardly in its middle portion. The ends of the spring terminate in eyes C C.

D D represent lugs which extend upward from the axle near one end, and E a lug extending upward from said axle near the other end. These lugs are preferably formed upon plates, as indicated at F F, which may be secured to the axle by clips G G. Through perforations in the lugs D D extends the pivot-bolt $h$, which passes through the eye at this end of the spring, while the eye at the other end of the spring is provided with a link-connection, J, which is pivoted to the lug E by a bolt, $k$. In this manner the spring is supported on the axle by connections which hold one end of the spring in fixed position, while the other end of the spring is allowed to play laterally in accordance with its elastic action and in the same plane with the axle. As the spring is extended by the weight of the vehicle and its contents, or by the operation of a rise in the road, the extension is allowed by the link-connection J, so there is no liability to fracture the spring. In a similar manner double parallel springs may be supported upon the axle, as indicated in the drawings.

What I claim, and desire to secure by Letters Patent, is—

The combination, with a vehicle-axle, of a clip at one end having short lugs perforated transversely to the axle and a clip at the opposite end having long lugs similarly perforated, of an arched vehicle-spring extending lengthwise above said axle and provided with eyes at its ends, a pivot-bolt connecting one end of the spring to the long lugs at one end of the axle, and an upwardly-projecting link connecting the other end of the spring to the opposite short lugs, whereby said spring has its lateral play in the same plane of the axle, substantially as specified.

In testimony whereof I affix my signature in presence of two witnesses.

CHARLES M. BLYDENBURGH.

Witnesses:
C. R. FERGUSON,
M. P. CALLAN.